C. W. COLE.
AUTOMOBILE ATTACHMENT.
APPLICATION FILED JAN. 31, 1917.

1,252,551. Patented Jan. 8, 1918.

WITNESSES
S. H. Saylor
Wm. H. Mulligan

INVENTOR
Clifford W. Cole.
BY Richard Bowen.
ATTORNEY

UNITED STATES PATENT OFFICE.

CLIFFORD W. COLE, OF CAMDEN, NEW JERSEY.

AUTOMOBILE ATTACHMENT.

1,252,551.     Specification of Letters Patent.     Patented Jan. 8, 1918.

Application filed January 31, 1917. Serial No. 145,800.

*To all whom it may concern:*

Be it known that I, CLIFFORD W. COLE, a citizen of the United States, residing at Camden, in the county of Camden and State of New Jersey, have invented certain new and useful Improvements in Automobile Attachments, of which the following is a specification.

This invention relates to an automobile attachment and the primary object of the invention is to provide a fender attachment arranged upon the vehicle and adapted to operate when the fender contacts with an object in front of the vehicle whereby the motor will be stopped and the brakes will be applied.

One object of the invention is to provide a movably mounted fender adapted to move rearwardly when in contact with any object in front of the vehicle whereby the brakes may be applied through the medium of suitable connecting means associated with the fender.

A further object of this invention is the provision of an automobile attachment which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which.

Figure 2:
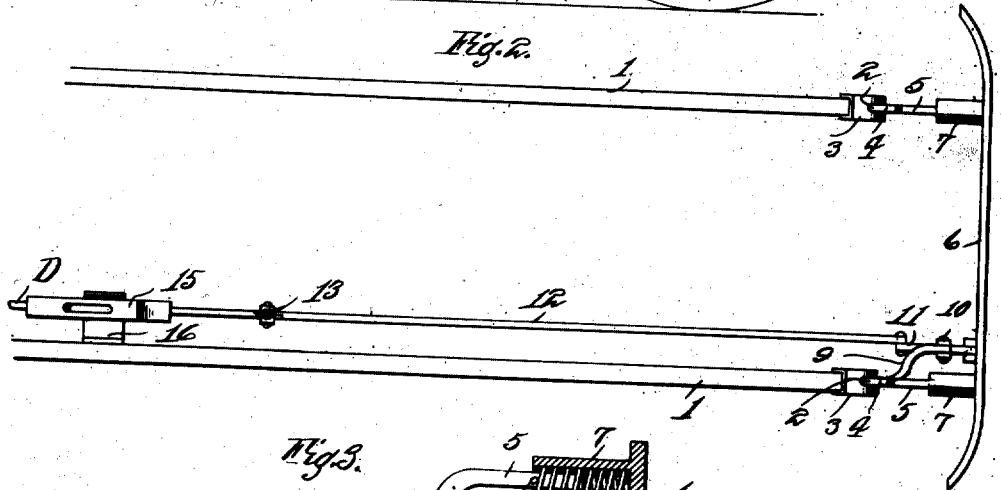
Fig. 2 is a plan of the operating structure associated with the side bars of the frame.
Figure 3:
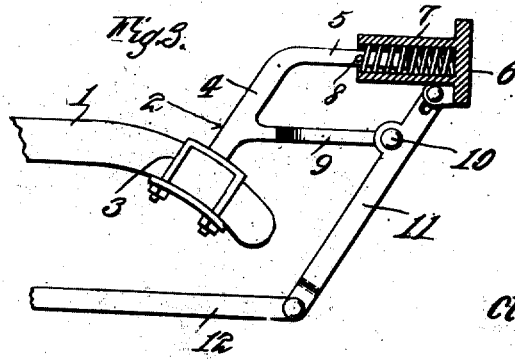
Fig. 3 is an enlarged detail view of a portion of the device.

Referring to the drawing, wherein is illustrated the preferred form of my invention, and in which like numerals of reference indicate corresponding parts throughout the several views, the chassis or frame 1 consists of the usual side frame bars projecting forwardly in the usual manner, the horns of the frame bars being curved downwardly for receiving the springs as is customary in devices of this character. Attached to each of the horns of the frame is a bracket 2 and each bracket includes a yoke 3 embracing the horn of each frame bar. Suitable fastening elements are associated with the yoke whereby each bracket may be securely held to the horn. Each bracket also includes an angularly disposed supporting arm 4, said arms having their terminals extending forwardly and disposed horizontally to provide the supporting rods 5. The fender 6 is of the usual construction and extends across the front of the vehicle. Connected to the rear side of the fender, adjacent each end thereof, is a sleeve 7 adapted to receive the corresponding rod 5. The sleeves are permitted to slide upon the rod whereby rearward and forward movement of the fender may be permitted. Incased within each sleeve and surrounding the end of each rod 5 is a coil expansion spring having one end bearing against the closed end of the sleeve and its opposite end against the pin 8 carried by the rod. These springs within the sleeves will tend to normally hold the fender in forwardly extended position. Integrally formed with the arm 4 is a curved fulcrum arm 9 which is curved inwardly as shown by Fig. 2 of the drawing and has its terminal provided with a pivot pin 10 for receiving the lever 11 the upper end of which is pivotally connected to the fender 6.

Figure 1:
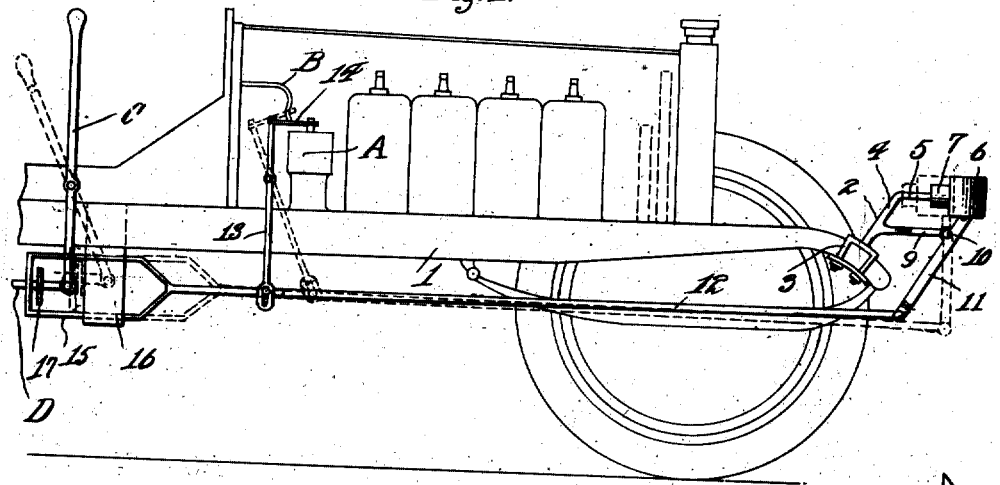
Figure 1 is a side elevation showing the forward portion of an automobile in diagrammatic outline and illustrating the manner of mounting my invention thereon.

As shown by Fig. 1 of the drawing, the spark coil A is connected in the usual manner with the electric wires B which complete the circuit for the spark coil in the usual manner. Pivotally mounted in close proximity to the spark coil A is a lever 13 which has its upper end provided with a clip 14 adapted to be normally engaged with the terminal of one of the wires B which are connected to the spark coil. The opposite end of the lever is associated with the upper end of the connecting rod 12. It is obvious that when the fender contacts with any object in its path it will immediately move rearwardly and operate the lever 11 which in turn will cause the lever 13 to move to the position shown by dotted lines in Fig. 1 thereby causing the clip 14 to loose the wire from the terminal on the spark coil. The motor will immediately cease to operate thus permitting the automobile to be quickly stopped.

In order that the brakes of the automobile may be simultaneously operated with the disconnection of the spark coil wires, I have provided a yoke 15 which embraces the end of the brake lever C where it joins to the brake 16 carried by one of the side frame bars whereby longitudinal movement of the yoke will be permitted. The forward end of the yoke has a connecting rod which is joined to the rod 12 at the point where the latter is pivotally connected to the lever 13. A suitable opening is provided in the end of the yoke 15 through which the rod D is extended while mounted upon the rod D is a collar 17 with which the end of the yoke will contact when the same is moved forwardly. It will be noted that when the rod 12 is moved forwardly for operating the lever 13, the yoke 15 will also be moved forwardly as shown by dotted lines in Fig. 1. When the end of the yoke contacts with the collar 17 which is rigidly fixed to the rod D, the rod will move forwardly to operate the brakes so that the vehicle will be brought to a quick stop. It is impossible for the brakes to be operated without the motor also being stopped since the wire disconnection and the application of the brakes are simultaneously made.

From the foregoing it will be observed that a very simple and durable automobile attachment has been provided, the details of which embody the preferred form. I desire it to be understood however, that slight changes in the minor details of construction may be made without departing from the spirit of the invention or the scope of the claims hereunto appended.

I claim:

1. In an automobile attachment, the combination with the frame, spark coil and brake rod, the said frame having its forward end curved to provide the usual horns, of a bracket mounted upon each of the said horns, a fender provided with sleeves embracing a portion of each bracket whereby the said fender may be rearwardly moved, and means connected to the said fender and associated with the said spark coil and the brake rod for disconnecting the spark coil and operating the brake rod to apply the brakes when the said fender is moved.

2. In an automobile attachment, the combination with the frame, spark coil and brake rod of a pair of brackets mounted upon the forward ends of the frame, each bracket including yokes embracing the frame and rigidly secured thereto, horizontally disposed supporting rods formed on the brackets, a fender, a pair of sleeves carried by the fender, each of which embraces one of the said supporting rods whereby the sleeves will be rearwardly movable on the said rods for permitting movement of the fender, resilient means for normally holding the fender in forwardly extended position, a fulcrum arm carried by one bracket, a lever pivotally mounted on the said fulcrum arm and connected to the said fender, and means connected to the said lever and associated with the spark coil and the said brake rod for operating the rod to apply the brakes.

In testimony whereof I affix my signature in presence of two witnesses.

CLIFFORD W. COLE.

Witnesses:
BESSIE M. COLE,
JOSEPH VALENTINE.